United States Patent [19]
Musil

[11] Patent Number: 4,942,645
[45] Date of Patent: Jul. 24, 1990

[54] FASTENER WITH INCREASED REACH-BACK

[75] Inventor: Edward C. Musil, Lyons, Ill.

[73] Assignee: Flexible Steel Lacing Company, Downers Grove, Ill.

[21] Appl. No.: 355,170

[22] Filed: May 22, 1989

[51] Int. Cl.$^5$ ................................................ F16G 3/02
[52] U.S. Cl. .................................. 24/33 C; 24/33 R; 24/33 B
[58] Field of Search ................... 24/33 C, 33 R, 33 B, 24/33 P, 33 M, 33 F; 474/257, 256, 255, 204, 205, 206

[56] References Cited

U.S. PATENT DOCUMENTS

| | | | |
|---|---|---|---|
| 1,300,437 | 4/1919 | McNicol | 24/33 B |
| 1,653,791 | 12/1927 | Tobolla | 24/33 C |
| 2,086,449 | 7/1937 | Timmerbeil | 24/33 C |
| 3,093,005 | 6/1963 | Dean | 474/257 |
| 3,107,406 | 10/1963 | Tebb | 24/33 C |
| 3,153,827 | 10/1964 | Phillips et al. | 24/33 C |
| 4,315,349 | 2/1982 | Stolz | 24/33 C |
| 4,625,369 | 12/1986 | Musil | 24/33 B |
| 4,653,156 | 3/1987 | Stolz et al. | 474/257 |
| 4,708,558 | 11/1987 | Musil | 24/33 C |

FOREIGN PATENT DOCUMENTS

| | | | |
|---|---|---|---|
| 1001187 | 2/1952 | France | |
| 1233111 | 10/1960 | France | |
| 9410 | of 1910 | United Kingdom | 24/33 B |
| 612565 | 11/1948 | United Kingdom | 24/33 B |

Primary Examiner—Victor N. Sakran
Attorney, Agent, or Firm—Fitch, Even, Tabin & Flannery

[57] ABSTRACT

A fastener and fastener assembly for coupling the ends of a conveyor belt to form a continuous belt where the preferred embodiment is a belt fastener having an upper and lower arm connected by a loop, and having a belt stop positioned to limit insertion of a conveyor belt end. The assembly utilizes a first and second set of fasteners mounted on opposite belt ends which intermesh to define a hinge passage for a hinge pin to couple the belt ends together. The reach-back of the belt ends into the belt fasteners is maximized as the belt stops are aligned with their belt loops and positioned to abut the belt end at a location where the exterior surface of a belt loop of the opposite belt fasteners is engaging or nearly engaging the belt end.

3 Claims, 3 Drawing Sheets

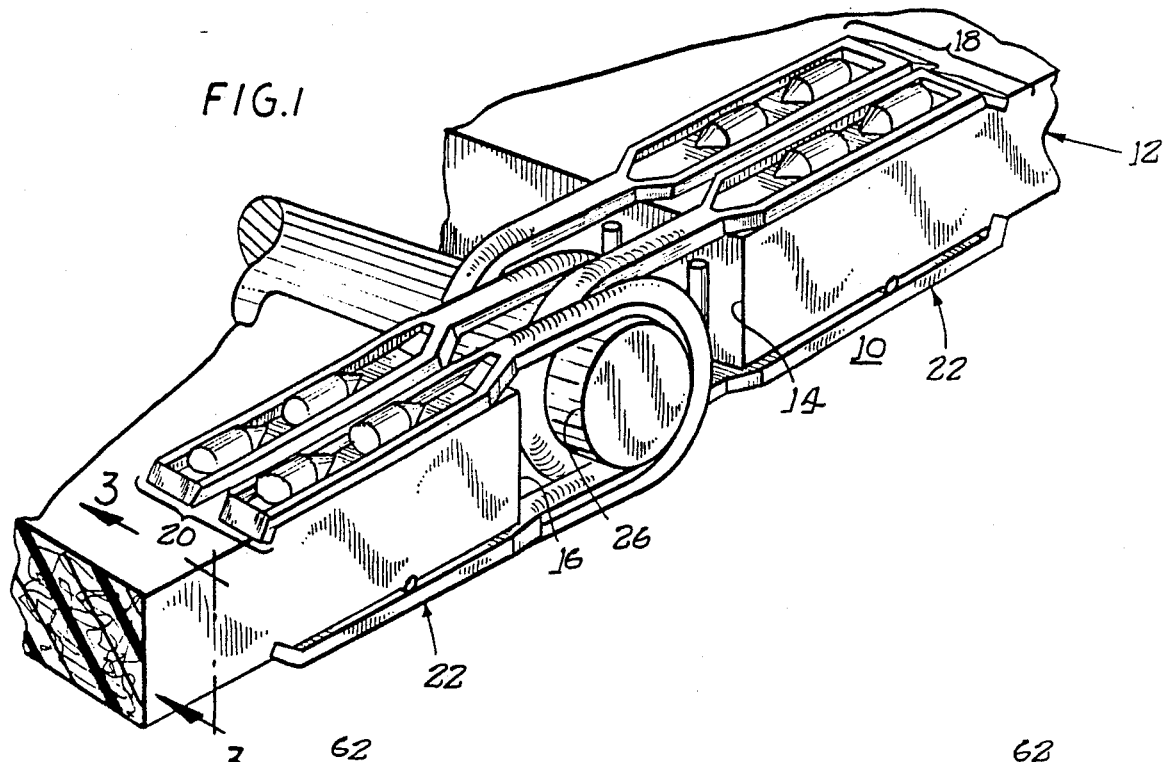
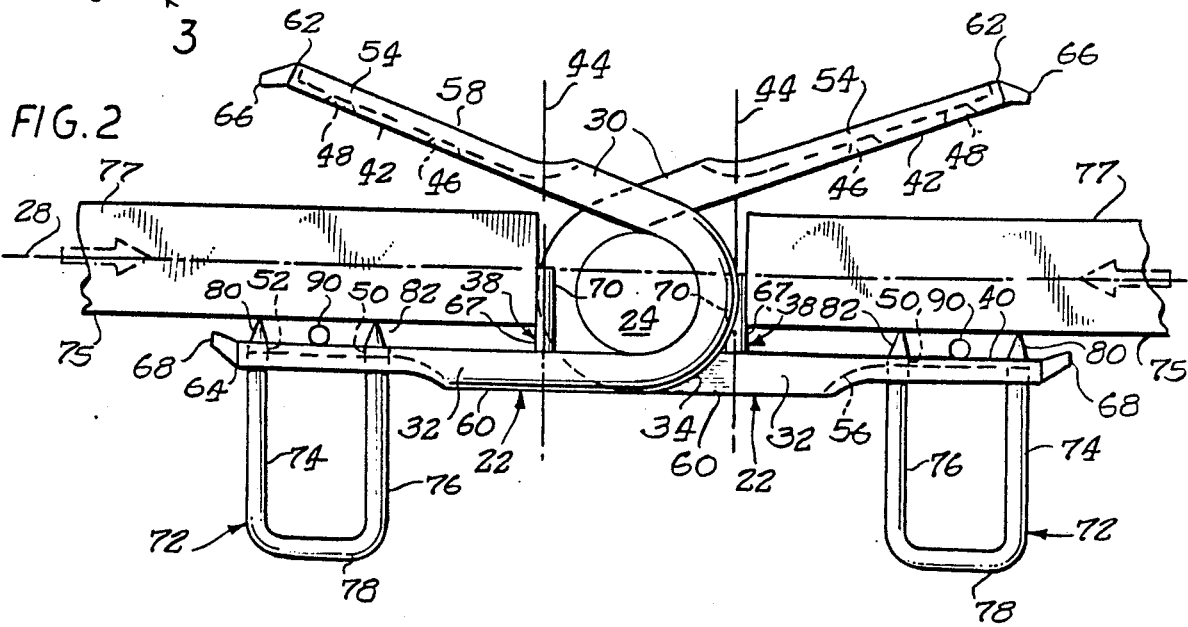
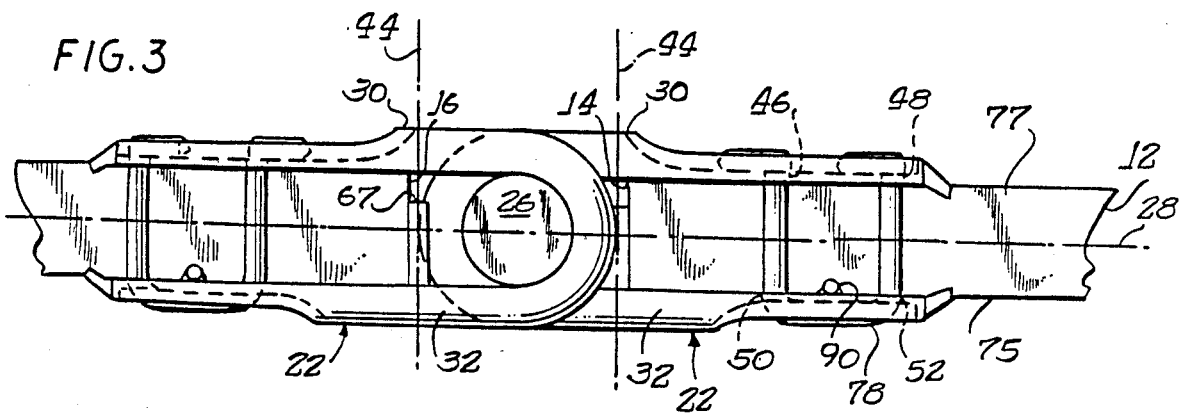

U.S. Patent   Jul. 24, 1990   Sheet 3 of 3   4,942,645

FASTENER WITH INCREASED REACH-BACK

BACKGROUND OF THE INVENTION

The present invention relates to an improved fastener and more particularly to a strip or aligned row of preformed individual fasteners for conveyor belts, which fasteners are secured in an array or alignment.

Although conveyor belts can be manufactured as continuous or endless belts, this would require manufacture to precise tolerances and possible limits to their adjustment in the application or final assembled product. Therefore, conveyor belts are frequently provided in predetermined lengths, which require belt fasteners to secure the two ends of the belt lengths together to form a continuous belt. The belt fasteners are stapled, riveted or otherwise fastened to the belt ends and thereafter are joined together by a coupling means usually in the form of a hinge pin. The belt fasteners may have various configurations, however, these various configurations aspire to maintain the maximum securing force on the belt end, minimal disruption to the belt configuration, minimal noise, maximum coupling pin size and maximum penetration of the belt end into the gripping or clamping arms without impeding or interfering with the movement of the belt over the sprockets and rollers of the conveyor belt system.

An exemplary illustration of a plurality of fasteners in a prearranged order is shown in U.S. Pat. No. 4,315,349 to Stolz, which ordered arrangement provides a means for visually checking the positioning of the belt end connection, provides stop means to limit the belt end entry into the connector, and secures the various separate elements in their relative position. More specifically, the connector strip, as disclosed and claimed, is comprised of preformed individual elements held together by a wire with a wavy shape, which also operates as a positive stop for the belt end. The thickness of the wavy wire limits the amount of reach-back of the belt end into the space between upper and lower arms of the belt fastener.

U.S. Pat. No. 4,625,369 to Musil provides a belt fastener formed from a blank of metal, which fastener has generally flat upper and lower plates. A strap or hinge loop connects these upper and lower plates and a belt stop extends from one of the plates to limit insertion of a belt end between the plates. The hinge loops from the belt fasteners on the first end of the belt are inserted into the spaces between the belt loops on the hinge fasteners secured to the second belt end and vice versa. The hinge loop penetration is limited by their contact with the facing sides of belt stops located at the inner ends of the spaces between the belt loops. The stop thickness was reduced by flattening, thus decreasing its size. The distance from the plate outer tips to the side of the stop contacting the belt is the reach-back distance. It is always desirable to maximize "reach-back" for a given hinge pin diameter used in the loops of the meshed belt fastener loops. The present invention moves the stop further into the gap between the fastener arms, thus eliminating this belt stop thickness and increasing the amount of reach-back. The belt stops of the fasteners of the present invention do not limit the amount of reach-back of the belt end into the gap between the upper and lower legs of the belt fastener.

As noted above, the amount of belt extension or penetration depth into the gap defined between the hinge loops or individual elements of the belt connectors is defined as "reach-back", and it is desirable to provide as much reach-back in the individual connectors as possible to maximize the amount of belt material between the staples or rivets and the belt end so that longitudinal belt tension forces do not pull the staples or rivets through the belt end. The structures taught and disclosed in the above-noted apparatus limit the penetration depth or reach-back of the belt into the space defined between the upper and lower gripping elements.

Although it appears that increased reach-back for an individual fastener could be provided merely by extending the connecting or fastener arm, it is undesirable to provide too long a fastener arm. The arm acts as a lever when the belt travels around a pulley or sprocket, causing the belt to flex or bend at the ends of the fasteners Continuous flexing and bending causes or may cause the belt to fail in fatigue. Consequently, it is most desirable to utilize as short an arm as physically possible for the size of the belt and the application but to maximize the use, that is reach-back, of the fastener arm.

SUMMARY OF THE INVENTION

The present invention provides an improved belt fastener, which permits increased reach-back of the contacting conveyor belt end while leaving a large space for a hinge pin, thus allowing use of a large hinge pin between such connector-coupled belt ends. The belt stops of the invention are positioned on the fasteners to allow maximum belt insertion between the fastener arms, or reach-back, as the thickness of the belt stops does not limit the amount of reach-back. The individual connector elements of one belt end are intermeshed or mated with the connector elements of the opposite end of the conveyor belt, and in this mated arrangement the connector elements cooperate to define a hinge pin passage between their opposing, meshed belt loops. The belt end is pressed against the individual positive belt stops, which are as far back as possible in the gap or mouth defined between the upper and lower surfaces of the connector arms. In the mated arrangement, the belt stops allow the mated belt loops of the opposed connector to be pivotable about the hinge pin with their outer surface in proximity to, but not contacting, the belt end retained in the mouth of the mating connector strip. In this configuration, the outer or furthest extending radius of each intermeshed connector element is generally operable or assembled such that its belt loop outer radius is in relative alignment or spatial relationship between the inner and outer extremities of the aligned positive belt stops. Therefore, the positive stops are more deeply recessed in the fastener gap and the belt end is consequently positioned as deeply as possible in the gap or mouth of each individual connector element.

The individual preformed connector elements of the connector strip of the present invention are interconnected and maintained in an aligned fashion by a connecting means, which is preferably in the form of a wire secured to and extending between the inside surface of an arm of each connector. The tips of the individual arm of each connector are inclined from the plane of the arm at a slight angle toward the defined gap to provide maximum securing and gripping of the belt end after closing and stapling of the several connector elements.

BRIEF DESCRIPTION OF THE DRAWINGS

In the Figures of the drawings, like reference numerals identify like components, and in the drawings:

FIG. 1 is a diagrammatic perspective view of several of the connector elements in intermeshed with a belt and hinge pin;

FIG. 2 is a plan view of the members of the fastener strip assembly and belt ends in an unassembled state;

FIG. 3 is a plan view of FIG. 2 illustrating a finished assembly;

DETAILED DESCRIPTION OF THE PREFERRED EMBODIMENT

Figure 4:
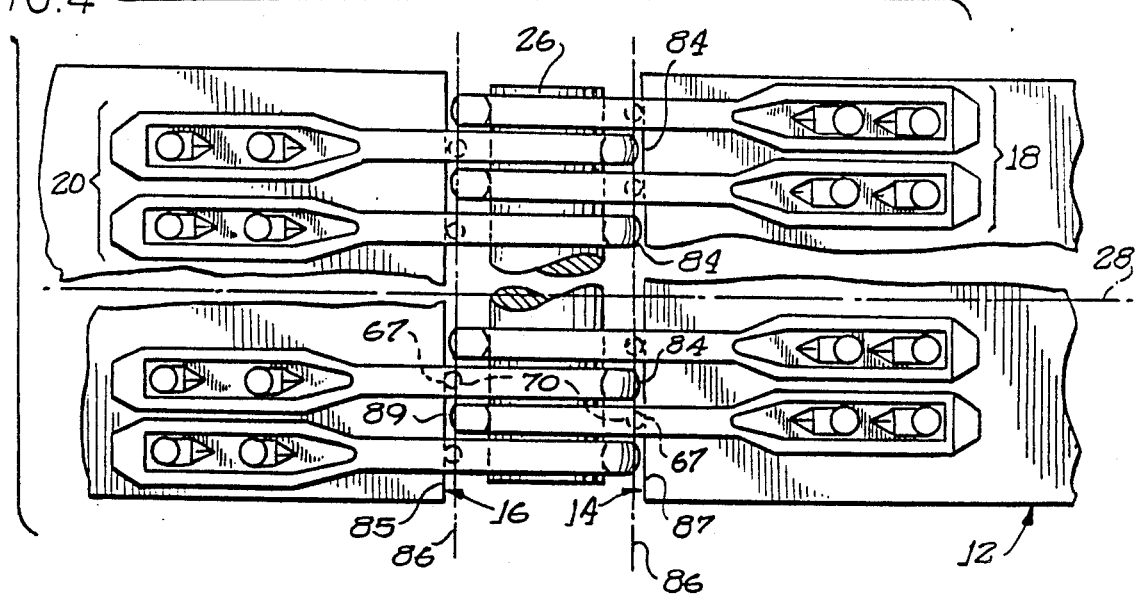
FIG. 4 is a top plan view of the as-assembled ends of the conveyor belt secured by a hinge pin.

Conveyor belts are utilized to transfer products and packages. These belts are generally provided in predetermined lengths requiring assembly or joining of their ends to form a continuous belt length. A variety of clamping or fastener assemblies are utilized to couple these belt ends, whether they are a new assembly or a repair of a ruptured or torn belt. Previous systems provide a plurality of plate clamps or staple-like individual fasteners extending from a belt end to form a loop, which belt end loops are intermeshed to receive a coupling device, that is usually a pin. These previous coupling devices either did not utilize a positive belt stop as a part of the fastener or the stops were located in a position limiting the reach-back, that is, the amount of the belt gripped by the fastener. Positive stops allow easier assembly and the ability to consistently locate the belt end in the fastener to aid in defining the belt loop.

The preferred embodiment of the present invention provides a relatively narrow belt fastener with a positive stop between the gripping arms, which stop is located in-line with the gripping arms. The individual fasteners are U-shaped and relatively thin armed, as opposed to the plate-type fasteners. The fasteners are usually provided as a plurality of fasteners connected by a joining means, such as a wire, to maintain the assembly in an aligned array which allows the utilization of as few or as many individual fasteners as required for the belt. The positive stops are positioned as close as possible to the base of the U-shape while still providing the maximum aperture for the coupling pin. The intermeshed fasteners from the opposed belt ends are not impeded by the stops as they are aligned with the fastener arm. Therefore, the belt ends are inserted as deeply as possible into the fasteners, thus allowing: maximum utilization of the connecting arm to secure the belt end; maintenance of the hinge or coupling pin aperture size at the maximum desired size; no impedance to the belt end assembly; relatively inexpensive manufacture of the fastener with a stop; and, an aligned array of fasteners allowing the user to utilize as many or as few fasteners as desired. Further, the positive stop, as a part of the fastener assembly, eliminates the necessity for such stops on the assembly and joining tools, and gives the maximum use of the fastener arm length, which minimizes the lever arm length for flexing of the belt end during rotation of the belt around a sprocket or pulley, thereby minimizing belt fatigue at the end of the fastener arm.

In the drawing at FIG. 1, an assembly 10 has a belt 12, which may be a conveyor belt, with opposed first end 14 and second end 16; and a first set 18 and a second set 20 of individual connectors or fasteners 22, which are mounted on first end 14 and second end 16, respectively. The individual connectors 22 of first set 18 mate or intermesh between the individual connectors 22 of second set 20. The intermeshed connectors 22 illustrated in FIG. 2 cooperate to define a hinge passage or aperture 24 for a hinge or connector pin 26 to couple first belt end 14 and second belt end 16, thus forming a continuous belt. The as-assembled first and second connector sets 18 and 20 securing belt 12 are coupled by hinge pin 26 and are illustrated in FIG. 3 along longitudinal axis 28 of belt 12. It is appreciated that the connectors at the outer edge of the assembled connection will only be in contact with one of the opposed belt end connectors 22.

The individual connectors 22 have similar structures and thus a single connector will be described in detail. A side view of an individual preformed connector body 22 is illustrated in an open or unassembled condition in FIG. 5, and includes upper or first arm 30 and lower or second arm 32. Preformed connector body 22 may be shaped by any means known in the art, such as extruding, drawing or roll forming, for example. A connecting or bridging means 34, shown as an arcuate loop, connects upper arm 30 and lower arm 32, which arms 30, 32 and loop 34 cooperate to define individual connector 22 as a U-shaped or forked member with a gap 36 between the upper and lower arms 30 and 32. A positive stop 38 for a belt end, shown as a pin, is mounted on inner surface or face 40 of lower arm 32 and protrudes into gap 36 in a normal or vertical manner from inner surface 40. It is appreciated that stop 38 with a longitudinal axis 44 could have been mounted on inner surface or face 42 of upper arm 30 in a normal or perpendicular manner. The utilization of a pin or cylindrical shape is a preferred embodiment and not a limitation, as it can be appreciated that a stop with a rectangular or other cross section could also have been utilized as a stop means.

Figure 5:
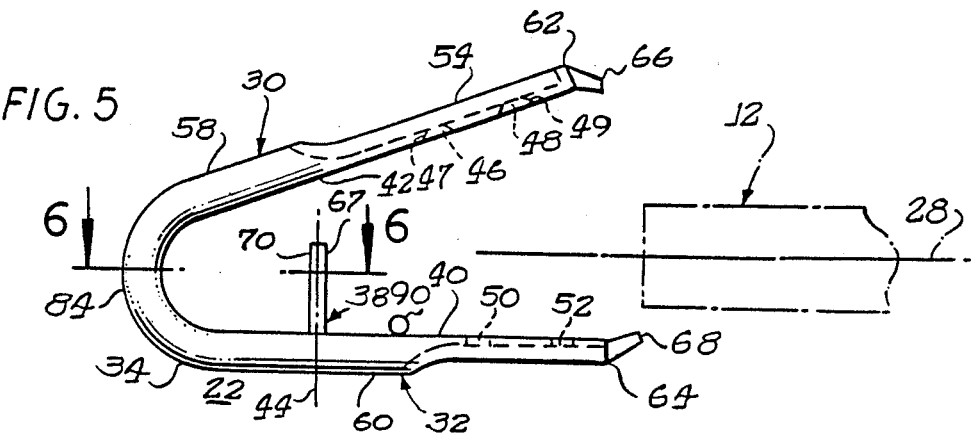
FIG. 5 is a plan view of an individual connector element and stop.

In FIG. 5, upper arm 30 has a pair of openings or apertures 46 and 48 with countersunk or tapered portions 47 and 49, respectively, for receiving staple legs, extending through arm 30 and perpendicular to inner surface 42. Similarly, lower arm 32 has a pair of apertures 50, 52 for receiving securing means, such as staple legs extending through arm 32 and perpendicular to surface 40. Apertures 46, 48 and 50, 52 are in vertical alignment after insertion, final assembly and securing of the belt in the gap 36, as shown in FIG. 3.

Arm 30 has an end-forming groove 54 at outer surface 58 and arm 32 has a staple head groove 56, for receiving the head of a staple along the outer surface of face 60 of lower arm 32. Each of arms 30, 32 have a terminus or free end 62 and 64, respectively, opposite the loop 34. As shown, grooves 54, 56 extend along connector arms 30, 32 in a direction generally parallel to belt longitudinal axis 28 in the as-assembled state in FIG. 3. Affixed to terminus or outer free ends 62, 64 are inwardly inclined protuberances or gripper lips 66 and 68, respectively, which, as shown in FIG. 3, are inclined toward axis 28 from the inner surfaces 40 and 42. Arms 30 and 32 can generally be characterized as mirror images or symmetrical arms, on either side of shoulder 34. However, upper groove 54 is or may be longer than groove 56 to receive the formed staple ends.

Figure 6:
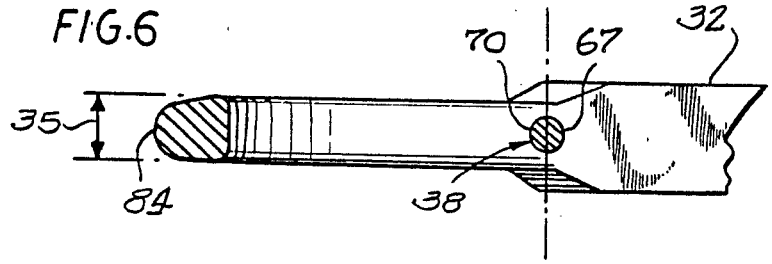
FIG. 6 is a cross-sectional view of the individual element of FIG. 5 taken on line 6—6.

FIG. 2 illustrates the connector elements 22 of the opposed first and second sets of connectors 18 and 20 in the open or unassembled condition prior to final securing to belt ends 14 and 16. Positive belt stops 38, relative to belt loop 34 and gap 36, have outwardly directed surfaces 67 and inwardly directed surfaces 70, that is, inward toward loop 34 and the closed portion of gap 36. Each loop 34 includes an outer rounded extremity surface 84 which almost abuts an end wall of the opposite belt end, as shown in FIG. 4. As best seen in FIG. 4, the belt end 16 has an end wall 85, which abuts the surface 67 of stops 38 of the left-hand set of belt fasteners 20, and the belt end 14 has an end wall 87, which abuts the surface 67 of stops 38 of the right hand set of belt fasteners 18. Also, the extremity surfaces 84 of the belt loops of sets 18 and 20 are in close proximity to the opposite belt ends 85 or 87. This deep penetration by the belt loop extremities 84 to the opposite belt allows stops 38 to be positioned as deeply as possible in gap 36 and ensures a maximum reach-back. In this maximum reach-back position, the innermost leg 76 of a staple 72, as well as leg 74, (cf. FIGS. 2 and 3) is located at the greatest possible distance from the belt end wall 14 or 16, and the greater this distance the greater the belt mass that must be torn before a belt end can be pulled from the fastener 22. Therefore, the grip by connector elements 22 of belt ends 14 and 16 is increased. As illustrated in FIGS. 4 and 6, the cross-sectional area of stop 38 is less than the width of loop body 35 or arms 30, 32, which minimizes the risk of contact from the opposed intermeshed connectors 22.

Securing means 72 are shown in FIGS. 2 and 3 as U-shaped staples having first leg 74 with staple end 80, second leg 76 with staple end 82, and connecting means or shoulder 78 coupling first and second legs 74, 76. The unassembled connectors 22 are illustrated with belt ends 14, 16 contacting posts 38. Belt 12 has a lower surface 75 and an upper surface 77. Belt lower surface 75 contacts staple ends 80 and 82 of securing means 72, which ends 80, 82, and first and second legs 74, 76 extend through lower arm passages 52 and 50, respectively. In the final or as-assembled state of FIG. 3, securing means 72 extends through belt 12, with staple ends 80 and 82 protruding through upper arm passages 48, 46, respectively, which are aligned with passages 50, 52. The staple ends are more easily directed into passages 48, 46 by the countersunk tapers 49, 47, respectively. The lower surface 75 of belt 12 contacts and is gripped or engaged by inner surface 40 of lower arm 32. Similarly, upper surface 77 of belt 12 contacts and grips inner surface 42 of upper arm 30. Thereafter, staple shoulder or coupling shoulder 78 is nested into groove 56 of lower ar 32 and staple ends 82 and 80 are deformed or bent to nest into groove 54, thus fastening staple 72.

Opposing ends 14, 16 of belt 12 are similarly secured by connector strips or sets 18 20, which are a plurality of individual connectors 22, and the opposed connector strips are intermeshed to define passage 24 to receive hinge pin 26. As illustrated in the Figures, hinge pin 26 is approximately equal to the thickness of belt 12, but may be any size selected for the connectors. Hinge pin 26 may be secured in passage 24 by means known in the art.

Multiple combinations or sets of individual connectors 22 are frequently utilized to secure conveyor belt ends, as the conveyor belts for most applications are of significant width and require more than one connector 22 on each belt end. Therefore, these individual connectors appear in ganged arrays or sets 18 and 20 as noted above. In the arrangement of these sets, the several extending stops 38 of the connectors 22 of the sets will have their longitudinal axes 44 generally parallel and in an aligned array along a single plane 86, as shown in FIG. 4. It can be seen that the individual positive stops 38 are recessed deeply in gap 36 for the belt. This gap depth; the relationship between extremity 84 and the belt ends; and, the position of stops 38 and the belt ends provides the maximum reach-back for each belt end, that is the depth of penetration into gap 36 by the conveyor belt ends from gripper lips 66, 68 of the fastener arms. Although the belt stops 38 are illustrated as mounted on each fastener 22, these stops 38 may also be mounted at spaced intervals, such as every second, third or fourth fastener.

The maximum reach-back for belt ends 14 and 16 is shown in FIG. 4. Second belt end wall 85 nearly abuts exterior extremity surfaces 84 of the first set of hinge loops 18 and abuts surfaces 67 on belt stops 38 of the second set of fasteners 20. The second set of hinge loops have an interior surface abutting the hinge pin 26 on its right side. The hinge pin left side, as shown in FIG. 4, abuts the interior surface of the first set of loops, and the exterior extremity surface 84 of the first strip fastener loops nearly abuts the second belt end 16, which has end wall 85 abutting the second belt stop 38 on the second belt fastener. Thus, no substantial gaps or spaces are provided by the thickness of the belt stop as in the fasteners disclosed in U.S. Pat. No. 4,625,369.

The various arrays or sets 18 and 20 of connectors 22 in the Figures are maintained in their ranked or aligned positions, especially as illustrated by the maintenance of stops 38 in the aligned fashion, by a connecting means which is, in this instance, in the form of a rod or wire 90 secured to one of inner surfaces 40 or 42 of connector arms 30 and 32. In FIGS. 2 and 3, the connecting wire 90 is illustrated between apertures 50 and 52 of lower arm 32 on inner surface 40, which is only an illustration and not a limitation. Wire or rod 90, which stretches across and is affixed to the faces of the aligned array of several connectors 22 to maintain them in an aligned position, is stiff enough to maintain them in their relative alignment, but may be readily broken to provide the number of belt fasteners needed for a particular belt width. In addition, it is noted that the wire or rod 90 may similarly be positioned in proximity to stop 38, such as between belt stop 38 and aperture 50, as illustrated in FIG. 5. Thus wire 90 may be affixed along the inner surfaces 40, 42 in any location which does not interfere with the structure and operation of the connectors 22. After assembly, rod 90 provides a further interference to movement of belt 12 and assists in maintaining belt 12 in its secured position, as noted in FIGS. 1 and 3. Wire or rod 90 can be secured to the faces 40, 42 by any means known in the art, such as welding, brazing or adhesive compound.

Herein, the illustrated belt fasteners are formed from shaped pieces of wire that have been die formed to provide the wider staple-receiving ends on the arms. The staple receiving grooves 54 and 56 are also formed in a progressive die as are the apertures 46, 48, 50 and 52 in the respective arms. While in some other fasteners made of plates the belt stop is integral with the plate, the wire fasteners described herein have a non-integral belt stop 38, which is welded to the lower arm, but the stop could also be made integral with the arm. The preferred connecting means 90 is the above-noted wire, but could also be an integral piece interconnecting adjacent fasteners when the arms are plates, such as disclosed in U.S. Pat. No. 4,625,369. The present invention is described in connection with wire fasteners but it is intended to also be applicable to plate fasteners.

Figure 7:
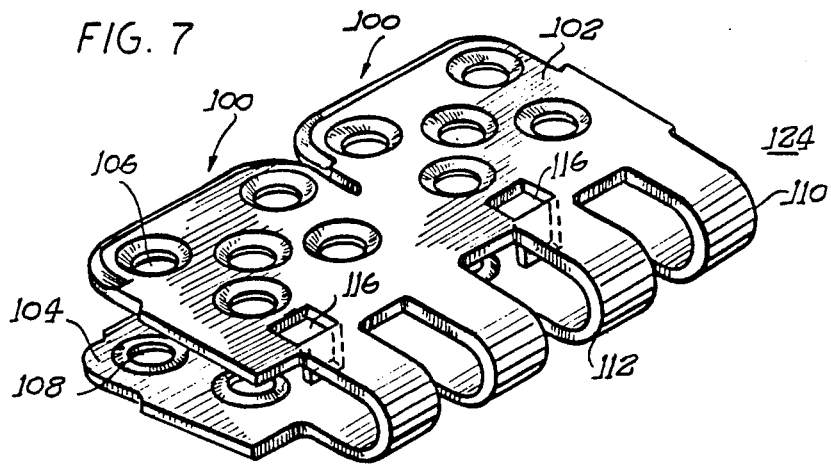
FIG. 7 is a perspective view of a plate-type belt fastener with a positive stop.
Figure 8:
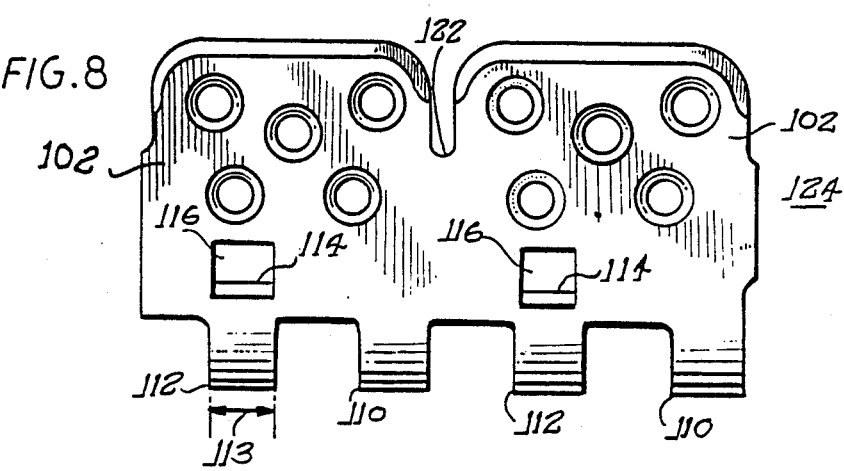
FIG. 8 top plan view of the plate-type fastener shown in FIG. 7.
Figure 9:
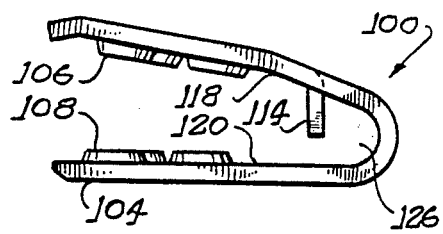
FIG. 9 is a plan view of the plate fastener and stop shown in FIG. 8.
Figure 10:
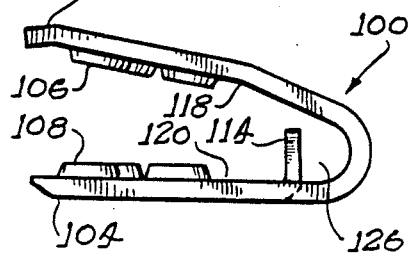
FIG. 10 is a plan view of an alternative embodiment of the plate fastener and stop of FIG. 8.

FIGS. 7-10 illustrate a plate-type belt fastener 100 with an upper plate 102 and lower plate 104, which plates each have a plurality of apertures 106, 108, respectively, an outer loop-shaped strap 110, and inner loop-shaped strap 112. Apertures 106, 108 are aligned to receive a securing means at final assembly of the belt and fasteners. In FIGS. 8 and 9, a belt stop 114 is pierced and formed from upper plate 102 in alignment with inner loop strap 112 As illustrated, the pierced plate thus defines an opening 116 where the stop material has been displaced. Although tabs 114 are illustrated as displaced along inner strap 112, it is appreciated that the stops 114 could be displaced in line with outer strap 110 and could have been pierced from lower plate 104. Alternatively, a stop 38, as illustrated in FIG. 10, can be welded or secured to one of the inner surfaces 118, 120 of upper plate 102 and lower plate 104, respectively. The plate fasteners may be formed from a single piece of material, such as metal, with a uniform thickness.

In FIGS. 7 and 8, a pair of upper plates 102 are joined at web 122 to form a fastener assembly 124. Web 122 between each pair of plates can maintain the several plate fasteners 100 and assembly 124 in an aligned array. Loop straps 110 and 112 of each fastener 100 form a hinge pin passage, which passages are aligned or concentric along an axis through the passage. The alignment of the several hinge pin passages provides a hinge pin aperture 126 (cf. FIGS. 9 and 10) to receive a hinge pin 26.

In FIGS. 9 and 10, straps 110, 112 and stops 114 generally cooperate to provide the hinge pin passage therebetween, however, it is noted that in an array of fasteners a stop 38 or 114 may not be provided at every fastener 100. Stops 38 or 114 in plates 100 are recessed as deeply as possible into the gap depth, as in connectors 22, to provide maximum reach-back. In addition, the width of stops 38 and 114 is less than the width 113 of loop straps 110 and 112, to thus avoid contacting or hindering the intermeshed loops from a mated fastener.

While only specific embodiments of the invention have been described and shown, it is apparent that various alternatives and modifications can be made thereto. It is therefore, the intention in the appended claims to cover all such modifications and alternatives as may fall within the true scope of the invention.

What is claimed is:

1. A belt and belt fastener assembly comprising:
   a belt having a first belt end and a second belt end to be joined together,
   a first set of belt fasteners comprising a plurality of belt fasteners each having upper and lower arms fastened to the first belt end at spaced locations along the first belt end, a second set of belt fasteners comprising a plurality of belt fasteners each having upper and lower arms fastened to the second belt end at spacial locations along the second belt end and intermeshed with the first set of belt fasteners,
   a first set of hinge loops joining the upper and lower arms on the first set of belt fasteners,
   a second set of hinge loops joining the upper and lower arms on the second set of belt fasteners with the second set of hinge loops being intermeshed with the first set of hinge loops and defining an opening,
   a hinge pin inserted through said opening defined by the intermeshed loops of the respective intermeshed hinge loops to joint he hinge loops together,
   outer extremity surfaces on the first set of hinge loops positioned adjacent the second belt end,
   outer extremity surfaces on the second set of hinge loops adjacent the first belt end,
   outer free ends on the upper and lower arms of the belt fasteners of the first and second sets of belt fasteners located at a reach back distance from the belt end,
   first belt stops on one of the arms of the first set of belt fasteners being offset with respect to the hinge loops of the second belt fasteners and engaging the first belt end,
   said first belt stops having belt engaging surfaces being offset with respective to the hinge loops of the second set of belt fasteners and engaging the first belt end so as not to interfere with each other during assembly and to allow the loops to move to the belt end to provide a maximum size of opening when the loops are at the first belt end,
   said belt engaging surfaces on said first set being substantially aligned with the exterior hinge loop surfaces of the second set of hinge loops and having a substantial portion of the first belt stops being located inwardly of said exterior hinge loop surfaces and towards the hinge pin to maximize a reach back distance from the free ends of the arms on the first set of belt fasteners,
   second belt stops on one of the arms of the second set of belt fasteners being offset with respect to the hinge loops of said first belt fasteners and engaging the second belt end so as not to interfere with each other during assembly and to allow the loops to move to the belt end to provide a maximum size of opening when the loops are at the second belt end,
   said belt engaging surfaces on said second set being substantially aligned with the exterior hinge loop surfaces of the first set of hinge loops and having a substantial portion of the second belt stops being located inwardly of said first exterior hinge loop surfaces and towards the hinge pin to maximize a reach back distance from the free ends of the arms on the second set of belt fasteners.

2. A belt fastener assembly in accordance with claim 1 in which said belt fasteners are made of wire and have upper and lower arms of wire, and in which a connecting means joins adjacent wire belt fasteners together with their respective hinge loops aligned to receive a hinge pin.

3. A belt fastener assembly in accordance with claim 1 in which said belt fasteners are plate fasteners made with substantial flat plates for the upper and lower arms and in which a connecting means joins adjacent plate belt fasteners together with their respective hinge loops aligned to receive a hinge pin.

* * * * *

UNITED STATES PATENT AND TRADEMARK OFFICE
CERTIFICATE OF CORRECTION

PATENT NO. : 4,942,645

DATED : July 24, 1990

INVENTOR(S) : Edward C. Musil

It is certified that error appears in the above-identified patent and that said Letters Patent is hereby corrected as shown below:

On the title page:
Under "Foreign Patent Documents", following "9410" (United Kingdom), "of 1910" should be --4/1910--.

Column 2, line 7, after "above-" delete the space.

Column 2, line 15, after "fasteners" insert --.-- (period).

Column 3, line 2, after "the" insert --individual--.

Column 3, line 2, after "intermeshed" insert --relationship--.

Column 3, line 16, after "8" insert --is a--.

Column 5, line 56, change "ar" to --arm--.

Column 5, line 59, after "18" insert --,--.(comma)

Column 7, line 17, after "112" insert --.--

Column 8, line 10, change "joint" to --join--.

Column 8, line 10, change "he" to --the--.

Column 8, line 18, change "reach back" to --reach-back--.

Column 8, line 25, change "respective" to --respect--.

Column 8, line 37, change "reach back" to --reach-back--.

UNITED STATES PATENT AND TRADEMARK OFFICE
CERTIFICATE OF CORRECTION

PATENT NO. : 4,942,645

DATED : July 24, 1990

INVENTOR(S) : Edward C. Musil

It is certified that error appears in the above-identified patent and that said Letters Patent is hereby corrected as shown below:

Column 8, line 52, change "reach back" to --reach-back--.

Signed and Sealed this

Seventh Day of April, 1992

Attest:

HARRY F. MANBECK, JR.

*Attesting Officer*      *Commissioner of Patents and Trademarks*